March 20, 1945.  D. A. MARRA  2,371,970
CUTTING TORCH
Filed Dec. 5, 1941
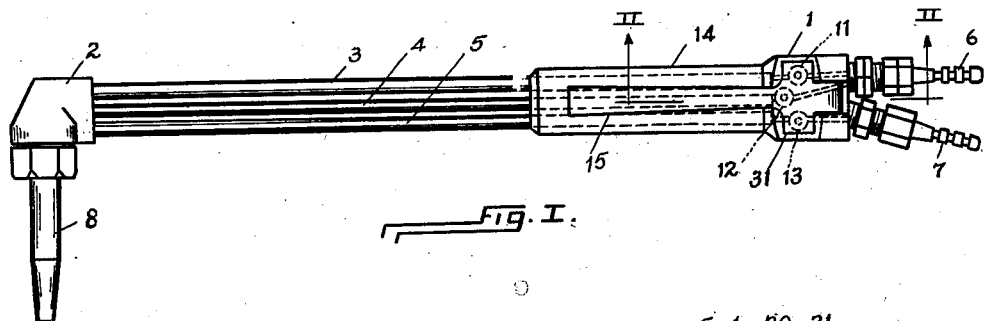
Fig. I.
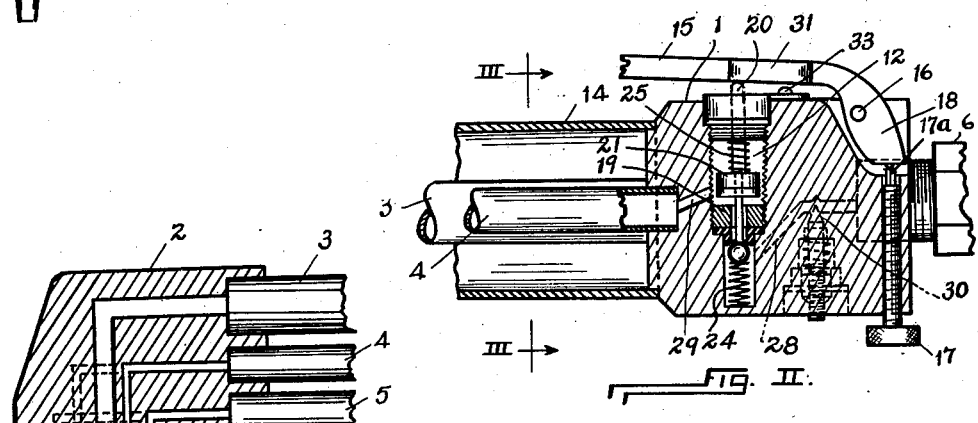
Fig. II.
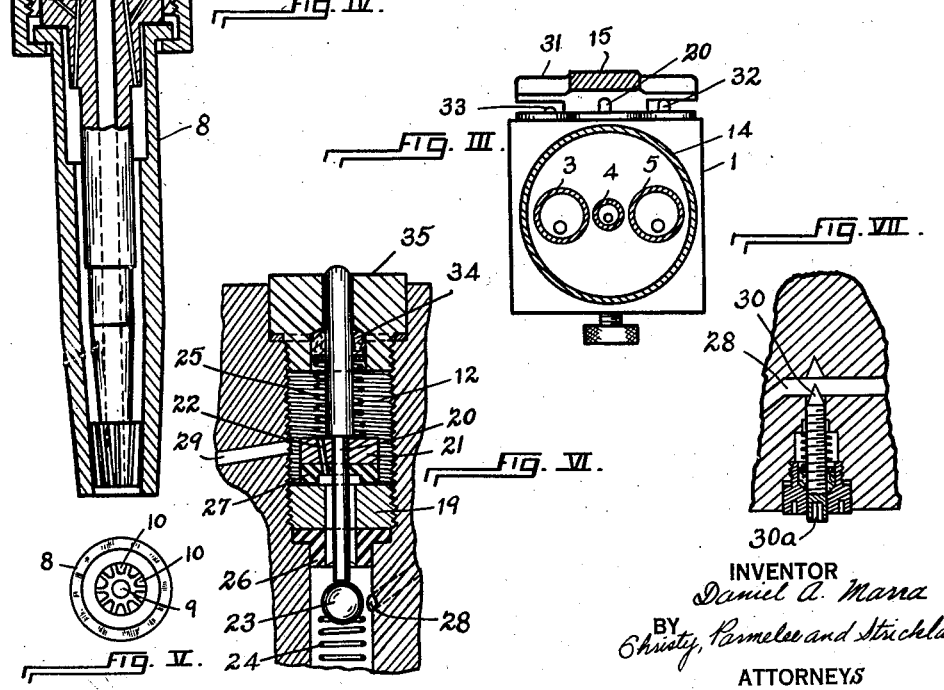
Fig. IV.
Fig. III.
Fig. VII.
Fig. VI.
Fig. V.
INVENTOR
Daniel A. Marra
BY Christy, Parmelee and Strickland
ATTORNEYS Patented Mar. 20, 1945

2,371,970

UNITED STATES PATENT OFFICE 2,371,970

CUTTING TORCH

Daniel A. Marra, Cheswick, Pa.

Application December 5, 1941, Serial No. 421,752

4 Claims. (Cl. 158—27.4)

This invention relates to cutting torches: instruments that are used for burning kerfs through metal articles, such as steel beams, for the purpose of severing them. The objects in view are simplicity of structure and efficiency in service.

In the accompanying drawing Fig. I is a view in side elevation of a cutting torch in whose structure the invention is embodied; Fig. II is a view to larger scale showing a portion of the torch in longitudinal and horizontal section, on the plane indicated at II—II, Fig. I; Fig. III is a view in transverse section, on the plane indicated at III—III, Fig. II; Fig. IV is a view to equal scale with Figs. II and III, showing in longitudinal and vertical section the tip-carrying delivery end of the torch of Fig. I; Fig. V is an end view of the tip in elevation; and Figs. VI and VII are views to yet larger scale, showing in fuller detail portions of the structure shown in Fig. II, and in Fig. VI certain movable parts are shown in positions that are alternate to those shown in Fig. II.

A cutting torch is an instrument that a workman carries in his hand and applies to the work. It is connected to supplies of gas and of oxygen under pressure, and the connections are flexible, that the instrument may be freely manipulated.

The requisites of a cutting torch are that it shall deliver through its tip, and successively as operation progresses, first a heating flame that, brought to play upon a steel beam, for instance, shall bring the metal in the region of immediate attack to the temperature of combustion. When such temperature has been attained, it is requisite, second, that the torch shall deliver to the so heated region a stream of oxygen. The oxygen so delivered burns the heated metal, and the burning of the iron releases heat, so that, without further supply of fuel through the torch, the work is progressively, beginning with the region of initial heating and continuing therefrom, brought to the temperature of combustion, and progressively burned away in a kerf that, with proper manipulation, extends in the plane in which the jet of oxygen is delivered. Additionally, it is a matter of convenience, and a practical requisite, that at all times when the torch, though not in use, lies ready for use, a pilot flame shall be burning from its tip, to afford ignition when the torch is taken up and put to use.

Referring to Fig. I of the drawing, a torch is shown that, in general features, is of familiar form. It consists essentially of a body 1, a head 2, and interconnecting pipes 3, 4, and 5. The body 1, at its rearward right-hand end is provided with leads 6 and 7, through which communication may be established with sources of oxygen under pressure and of fuel gas under pressure. Within the body 1 passageways are formed, through which oxygen may flow to pipes 3 and 4 and gas to pipe 5. Those passageways are subject to control by valves, as presently will be explained. The head 2 of the torch carries the removable and replaceable tip 8. The tip is cylindrical, and is formed with an axial bore that emerges through a central orifice 9, and with passageways and a mixing chamber that opens through a plurality of circumferentially arranged orifices 10. Within the head 2 are passageways through which the oxygen pipe 3 communicates with the axial bore of the seated tip, and the oxygen pipe 4 and the gas pipe 5 communicate with passageways in the seated tip that lead to the mixing chamber. These features are known to the industry, and require no fuller statement.

It is already known that valve control may be provided, to establish the three conditions named below: (1) flow at low rate of oxygen and of gas through pipes 4 and 5, while flow through pipe 3 is cut off, so that no more than a pilot flame burns from orifices 10; (2) flow at high rate of oxygen and of gas through pipes 4 and 5, while flow through pipe 3 is cut off, so that a heating flame burns from orifices 10; and (3) flow of oxygen through pipe 3, while flow of oxygen and of gas through pipes 4 and 5 is reduced to the low rate first named, so that cutting oxygen is supplied through orifice 9 to the heated work, while only a minimum flame burns from the orifices 10. In cutting torches that heretofore have been devised, the several valves by which these several lines of flow through the torch have been established have been provided with independent means of adjustment and control, and in consequence the workman in the progress of operation has had to pause, remove the torch from application to the work, and, while holding the torch in one hand, to make valve adjustment with the other.

In the torch of my invention three valve chests 11, 12, and 13 are formed in the body 1 of the torch. They are essentially cylindrical, and the valves within them move axially. They are conveniently arranged in axial parallelism; the stems of the valves are adjacently arranged and protrude all of them through one face of the head. The valves within the chests are made subject to shifting means under the control of the workman in the grasp of the hand that holds the torch. From the forward end of the body 1 of the torch extends a stock, conveniently in the form of a cylinder 14 surrounding the pipes 3, 4, and 5. This cylindrical extension constitutes the handle by which the workman takes the torch in his grasp and moves it as he will. A lever 15 is pivoted to the body 1 of the torch at 16, and the power arm of the lever (it is in this instance a lever of the second kind) extends longitudinally of and adjacent to the handle 14, so that it comes with the handle within the grasp of the workman in his use of the torch. The range of swing of the lever may be adjusted by means of a screw 17 upon which the heel 18 of the lever when swinging clockwise (Fig. II) makes abutment. My invention consists in bringing the three valves within the three valve chests under the control of this single lever, and in so designing and proportioning the valves that, pilot-light flow alone being normal, proper swinging of the lever will establish in succession or in alternation either of the other two of the three conditions of operation defined above.

In Figs. II and VI I have shown in detail the valve chest 12 and the valve within it. Through this valve chest air flows to pipe 4; and, as will be understood from what has gone before, air flow through this valve chest is always maintained, either at the low rate requisite to the maintenance of a pilot flame through the orifices 10, or at the high rate requisite to the maintenance of a heating flame.

Within the valve chest is arranged a valve block 19, adjustable in its position, by virtue of its screw-thread mounting in the essentially cylindrical chest, as best shown in Fig. VI. The valve block is axially perforate, and through the perforation extends the stem 20 of a valve 21 that seats from above downwardly upon the valve block 19. The valve 21 is provided with a by-pass of limited and predetermined size, conveniently in the form of a perforation 22 that penetrates the valve body. Extending through the axial perforation in the valve block (the perforation is of a size to allow flow at maximum rate through it and around the valve stem), the stem 20 abuts upon a ball valve 23 backed by a spring 24. The ball valve seats upwardly (as seen in Fig. II) upon the lower end of the perforation through the valve block. The drawing shows that the valve block 19 and the valve 21 are provided with facings 26 and 27 of suitable material, to afford tight closure of valve 23 upwardly and valve 21 downwardly. A passageway 28 leads from the source of oxygen supply to the valve chest beneath valve block 19, and a passageway 29 leads from the valve chest above the valve block to the oxygen pipe 4. In the passageway 28, as shown in Figs. II and VII, a valve 30 is set, to fix at proper value the effective size of the passageway. The valve stem 20 protruding through the head of the cylindrical valve chest is arranged to be engaged by the lever 15 and to be shifted when the lever is swung counter-clockwise, Fig. II.

It will be seen that the tension of spring 24 is exerted to carry valve 23 toward its seat and to shift the stem 20 upward. In the assembly the lever is by the adjustment of screw 17 so set that the abutment of the valve stem 20 upon it is effective to limit the range of spring-impelled advance of valve 23 and to hold valve 23 spaced from its seat at such slight interval as allows passage of an oxygen flow sufficient to maintain a pilot flame at the burner orifices 10, but not more. As the lever 15 is swung (counter-clockwise, Fig. II) the interval at which valve 23 is held remote from its seat is widened; and while by the same swing of lever 15 the valve 21 is caused to advance toward its seat, the effective opening of this valve 21 is not during this earlier portion of the range of swing of lever 15 diminished. The consequence then of the swing of lever 15 through this earlier portion of its range is that the rate of flow of oxygen is increased and (the parts being properly proportioned) is brought to a value adequate to sustain a heating flame at the burner. Further swinging of the lever 15 is effective to seat valve 21 and then, although valve 23 is opened wide, flow of oxygen is through by-pass 22 only, and this by-pass is such in size as to permit flow at a rate sufficient only to sustain a pilot flame. Thus the three conditions of oxygen flow through pipe 4 are established: (1) normal flow at low rate, adequate for the pilot flame only; (2) flow at accelerated rate, adequate for the heating flame; and (3) flow at a rate reduced again to that adequate for the pilot flame only. When pressure upon lever 15 is relieved, the tension in spring 24 is exerted through stem 20 upon the lever, tending to swing it clockwise, Fig. II. As the lever swings clockwise from position of cutting (at the extremity of its range) back to inactive position, the flow of oxygen, momently augmented, is immediately reduced again, and the pilot flame is maintained, burning from the tip.

A body of packing 34 is provided for the stem 20 in its passage through the head 35 of the valve chest, and a spring 25 acts upon the packing to make it effective. This spring may find backing, as shown, in the body of valve 21; and in such case the strength of the spring will not be so great as to interfere with the operation of spring-backed valve 23 in the manner described.

Comparison of Figs. I and II will show the three valve chests 11, 12, and 13, to be grouped, with chest 12 somewhat in advance (to the left) and chests 11 and 13 in side-by-side positions. This is a convenient, though not an essential grouping. The figures also show the lever 15 to be widened laterally into a plate 31 that overlies the entire grouping.

The valve chest 13, through which fuel gas flows, and the valve structure within it, may be understood to be in all respects substantially identical with chest 12 and its valve structure, already described, with this single qualification: that the stem 32 of its valve protrudes upwardly to such slighter degree as to be borne upon by the plate 31 of lever 15 simultaneously with the valve stem 20 (the difference in the distances of the two stems from the fulcrum point of the lever necessitates this—although, alternately, the plate 31 might manifestly be shaped to afford the same compensation). Without further explanation it will be understood that the flow of gas through pipe 5 is thus co-ordinated with the flow of oxygen through pipe 4, to the end already described, that normally a pilot flame emerges from the tip 8, and that in the range of the swing of lever 15 two succeeding conditions are established: first, of flow adequate to produce and sustain a heating flame, and, second, flow that is diminished again to that which suffices for a pilot flame and no more.

As already noted, the valve 30 may be adjusted to fix at proper value the size of the passage 28. An identical valve is set in the passageway leading from the gas inlet 7 to the valve chamber 13, and thus it is that the effective size of the oxygen and gas passages leading to the pipes 4 and 5 may be fixed, and the torch (in a manner familiar to the art) adapted to the use of tips of various sorts and sizes.

Facility in the adjustment of the valves 30 is gained through a refinement in the structure of the lever-adjusting stem 17. Specifically, the upper end of the stem (Fig. II) is provided with a tip 17a of polygonal cross section, and in the outer end of each valve 30 (Fig. VII) a complementary socket 30a is formed. Manifestly, the stem 17, upon removal from normal position of service in body 1, may be used as a socket-wrench in adjusting the valves 30. Thus, the stem 17 becomes an effective instrumentality for adjusting the positions of the several valves described, and, since it is itself an essential element of the structure, no other tool is required, and the torch is complete and completely serviceable in and of itself. There is no ancillary tool to be lost or forgotten.

The third valve chest 11 contains a valve that normally is held closed. The valve is unseated by the abutment of the advancing plate 31 of the lever 15 upon the stem 33; and, as illustrated in Fig. II, the stem 33 of this valve extends upward for such limited distance that it is only after the heating-flame controlling valves have been shifted and a heating flame has been caused to spring from tip 8 that further swing of the lever 15 in counter-clockwise turning (Fig. II) will unseat the valve in valve chest 11. The unseating of this valve opens the line of flow from the source of oxygen under pressure through pipe 3 to the axial bore in tip 8 (at the same time, as has been explained, the flame from the tip is diminished to pilot-flame magnitude). The oxygen that then flows through pipe 3 and has exit through orifice 9 of the tip is of a magnitude adequate for cutting purposes. The swing of the lever is, it will be seen, unidirectional in effecting the successive valve shifts.

The valve structure within the valve chest 11 may be understood to be a counterpart of that within valve chest 12, shown in Fig. II, with this qualification, that, while the stem 20 (33) is retained, the valve 21 is omitted, and the spring 25 also is omitted. The valve 23 then, under the tension of spring 24, is effective to cut off flow until, on the swing of 15 to the limit in counter-clockwise direction, Fig. II, the thrust of the stem 33 unseats the valve. Only then is cutting-oxygen flow established.

In operation, beginning with the parts in the positions indicated in Fig. II, it may be understood that gas and air connections have been made, the proper cocks turned, and that a pilot flame is burning from the tip. The workman takes the torch in hand, grasping it by the stock 14. The normal position is that shown in Fig. I, with the tip 8 directed downwardly. Naturally then the palm of the workman's hand engages the handle on the farther side, the thumb lies along the upper surface of the stock, and the finger tips come naturally to rest upon the lever 15. The workman presses upon the lever and swings it until he produces a heating flame, springing from the tip. This he may easily do, and may easily maintain such position of the lever indefinitely. When he has applied the heating flame to the work and has continued the play of flame upon the work until proper temperature has been gained, he increases pressure, swings lever 15 all the way, and in so doing causes cutting oxygen to spring in a jet from the tip. Under its influence the metal burns away and the kerf is cut. Should the heat fail, relaxation of pressure will re-establish the heating flame in place of the oxygen jet, and, then, when temperature has been regained, oxygen may be applied again. When the job is finished, lever 15 is released, and again a pilot flame is reestablished, burning from the tip.

When the torch goes out of service, as at night, for instance, the adjusting screw 17 may be retracted, and the valves 23 allowed to close.

I claim as my invention:

1. In a cutting torch having a torch tip carried by a body including a passage for gas, a passage for heating oxygen, and a passage for cutting oxygen, said body including valve chests arranged severally in the lines of flow through said passages, valves equipped with valve stems organized with said valve chests severally, the valve of said cutting oxygen passage being movable between passage-closing and passage-opening positions, the valves of said gas and heating-oxygen passages including means operative in the unidirectional shift of the valves first to increase and then to diminish the effective size of the two passages, and a movable member adapted in the course of unidirectional movement first to shift the stems of the gas and heating-oxygen valves through the flow-increasing portion of their range of valve-shifting movement, and then, in its further progress, additionally to shift the stem of the cutting-oxygen valve from closed to open position while continuing the movement of the gas and heating-oxygen valve stems through the flow-diminishing portion of their range of valve-shifting movement.

2. In a cutting torch, a body in which are included three passageways, one passageway for gas, one for heating oxygen, and one for cutting oxygen, a valve chest arranged in each of said passageways, three valve structures arranged in said valve chests severally with valve stems extending all from a single face of the torch body, a lever pivoted to the torch body and adapted in its range of swing to bear upon such projecting ends of the valve stems and shift them, the bearing of the lever upon the valve stems of the gas and heating-oxygen valves being effected in an initial swing, and the bearing upon the stem of the cutting-oxygen valve being effected by a further swing of the lever in the same direction, the valve structures whose stems are so first engaged being adapted to afford first an enlargement and then a diminution of the effective size of the gas and heating-oxygen passageways in which they are included, and the valve structure whose stem is last engaged being adapted to open the otherwise closed cutting-oxygen passageway in which it is included.

3. In a blowpipe including a body having two passageways, one passageway for gas and one for oxygen, a valve chest in each passageway, a valve structure in each chest, and a valve-operating device for each valve structure; the invention herein described comprising in each valve chest a member having a passage arranged in the line of flow through the chest, the valve structure in the chest including two valve elements arranged for cooperation, one with each end of said passage, the valve-operating device comprising a stem extending through said member and serving to hold said valve elements spaced apart a greater distance than the length of said passage, a spring normally urging one of the valve elements towards flow-inhibiting position over one end of said passage, with the second valve element spaced from the other end of the passage, and means for shifting the valve stems of both valve structures to shift the first valve element of both out of flow-inhibiting position and the second valve element of both towards flow-inhibiting position relatively to the ends of the passages through which the valve stems extend, and a by-pass arranged with each valve structure to afford a restricted flow of gas and oxygen when the second valve elements enter flow-inhibiting position.

4. In a blowpipe including a body having two passageways, one passageway for gas and one for oxygen, a valve chest in each passageway, a valve structure in each chest, and a valve-operating device for each valve structure; the invention herein described comprising in each valve chest a member having a passage arranged in the line of flow through the chest, the valve structure in the chest including two valve elements arranged for cooperation, one with each end of said passage, said valve elements being spaced a greater distance than the distance between the ends of said passage and means normally urging the first of the valve elements towards flow-inhibiting position relatively to said passage, with the second valve element spaced from said passage, and means for sifting the valve-operating devices of both valve structures to shift the first valve element of each valve structure into flow-increasing position and the second valve element of each into flow-diminishing position with respect to said passage, and a by-pass arranged with each valve structure to afford a restricted flow of gas and oxygen when the second valve elements enter flow-inhibiting position.

DANIEL A. MARRA.